United States Patent [19]

Rhodes et al.

[11] 3,709,026
[45] Jan. 9, 1973

[54] APPARATUS AND METHOD FOR SIMULATING SPACECRAFT EROSION

[75] Inventors: Barry V. Rhodes, Canoga Park; Daniel E. Bloxsom, Los Angeles, both of Calif.

[73] Assignee: KMS Industries, Inc., Ann Arbor, Mich.

[22] Filed: Nov. 12, 1968

[21] Appl. No.: 774,754

[52] U.S. Cl. ..................................73/12, 73/432 SD
[51] Int. Cl. ..............................................G01n 3/08
[58] Field of Search ........310/11; 73/12, 170, 7, 147; 89/7, 8; 313/62, 63, 432, 15

[56] References Cited

UNITED STATES PATENTS

| | | | |
|---|---|---|---|
| 2,884,113 | 4/1959 | Converse et al. | 198/19 |
| 2,907,200 | 10/1959 | Roberts et al. | 73/7 |
| 2,995,035 | 8/1961 | Bloxsom et al. | 73/147 |
| 3,062,362 | 11/1962 | Erkelens et al. | 198/209 |
| 3,121,329 | 2/1964 | Bennett | 73/147 |
| 3,191,092 | 6/1965 | Baker et al. | 315/111 |
| 3,221,534 | 12/1965 | Alfred et al. | 73/7 |
| 3,267,720 | 8/1966 | Escallier et al. | 73/12 |
| 3,374,668 | 3/1968 | Godfrey | 73/147 |
| 3,396,584 | 8/1968 | Badin et al. | 73/432 |
| 3,479,857 | 11/1969 | Bloxsom et al. | 73/12 |
| 3,010,220 | 11/1961 | Schueller | 35/12 |
| 3,064,364 | 11/1962 | Schueller | 35/12 |

OTHER PUBLICATIONS

Solar Radiation Simulator, Genarco Inc., May 2, 1962
K. A. Zandstra, Inst. of Fuel, J. U38n297, October 1965, p. 450-5.

A. Audsley et al., Thermal Plasmas, The Chemical Engineer, September 1967, pp. CE 90-192.
Hill, Apollo CM/LM . . . Chamber Tests, Aerospace Technology, June 3, 1968.
Babjak et al., Environmental Test Facility Vacuum, February, 1968, pp. 57-62.
Long Term Space Simulation, Cliffor et al., Research/Development, July/1968, pp. 44-48.

*Primary Examiner*—Richard C. Queisser
*Assistant Examiner*—John Whalen
*Attorney*—Sellers and Brace

[57] ABSTRACT

An apparatus and method for simulating erosion on a spacecraft surface by impact with particulate in a preselected environment. The apparatus and method are ground-based and have the capabilities of simulating all significant environment conditions for a complete trajectory on different test objects including pressure, temperature, heat transfer attitude, altitude, wind and skin friction loads, relative velocity during impact with particulate including successive and cumulative effects of collision with a variety of particulate including dust, micrometeorites, vapor, ice, rain, snow and others. Cumulative test effects can be produced in rapid succession and individually observed and recorded under desired appropriate space environmental conditions selected as desired and, if preferred, under arbitrarily chosen severe conditions. If so elected, a given test may be continued to the point of total destruction of the test object. The equipment includes unique means for generating desired temperatures on the test object, a unique system for simulating particulate in space and for accelerating different kinds thereof in succession to desired velocities to and including hypersonic and for colliding the same with the test object while recording the produced effects of collision.

41 Claims, 12 Drawing Figures

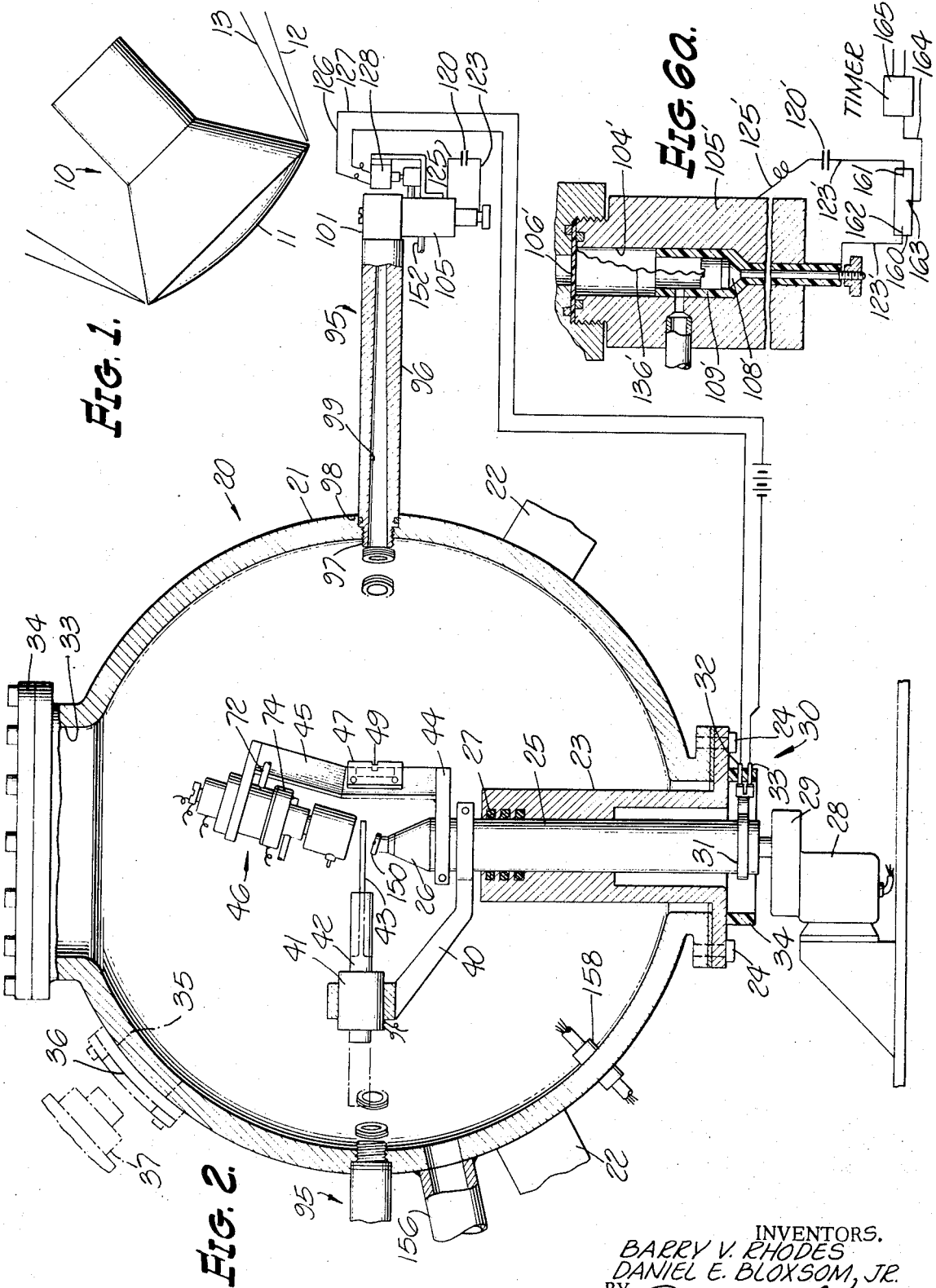

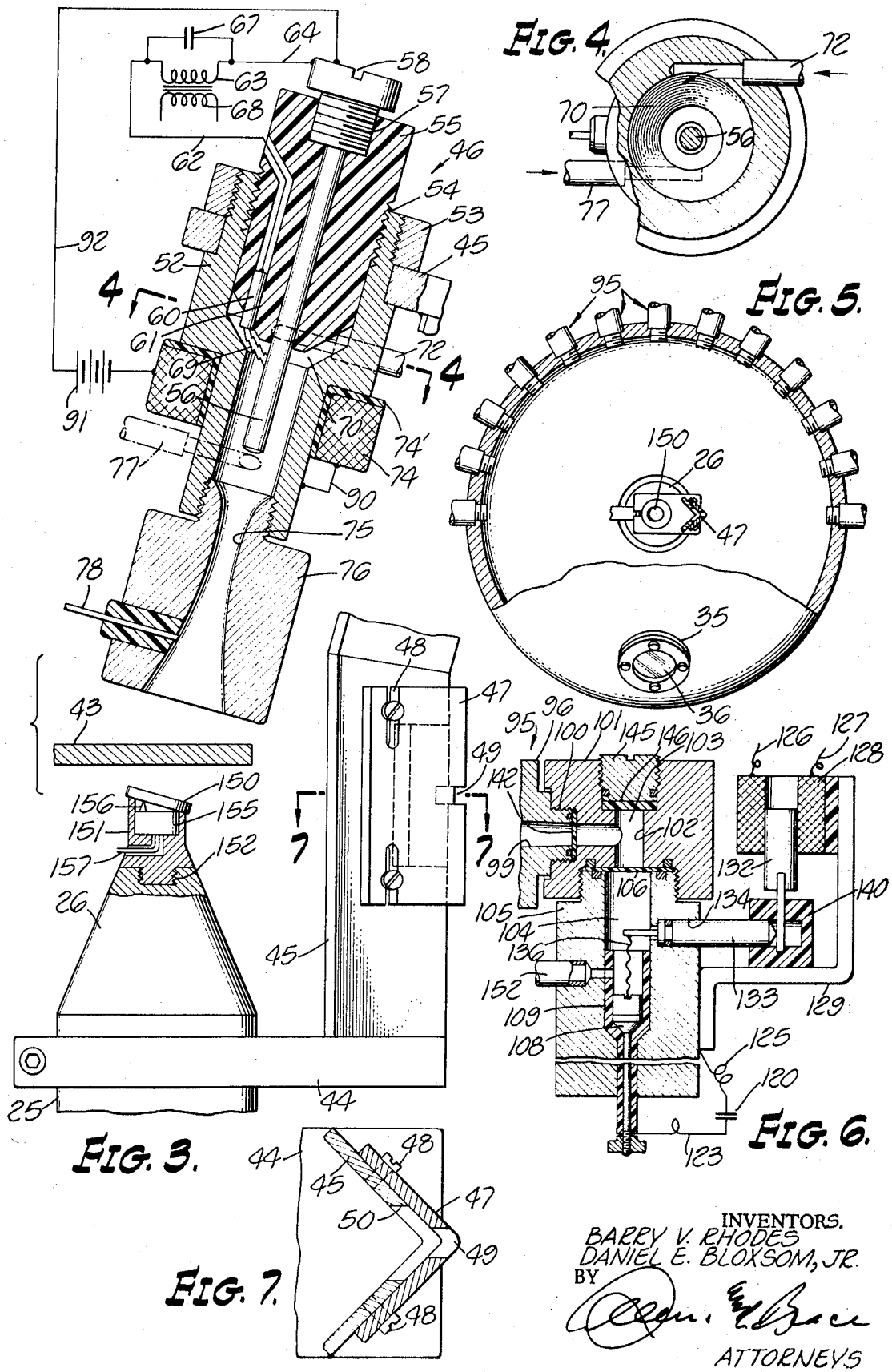

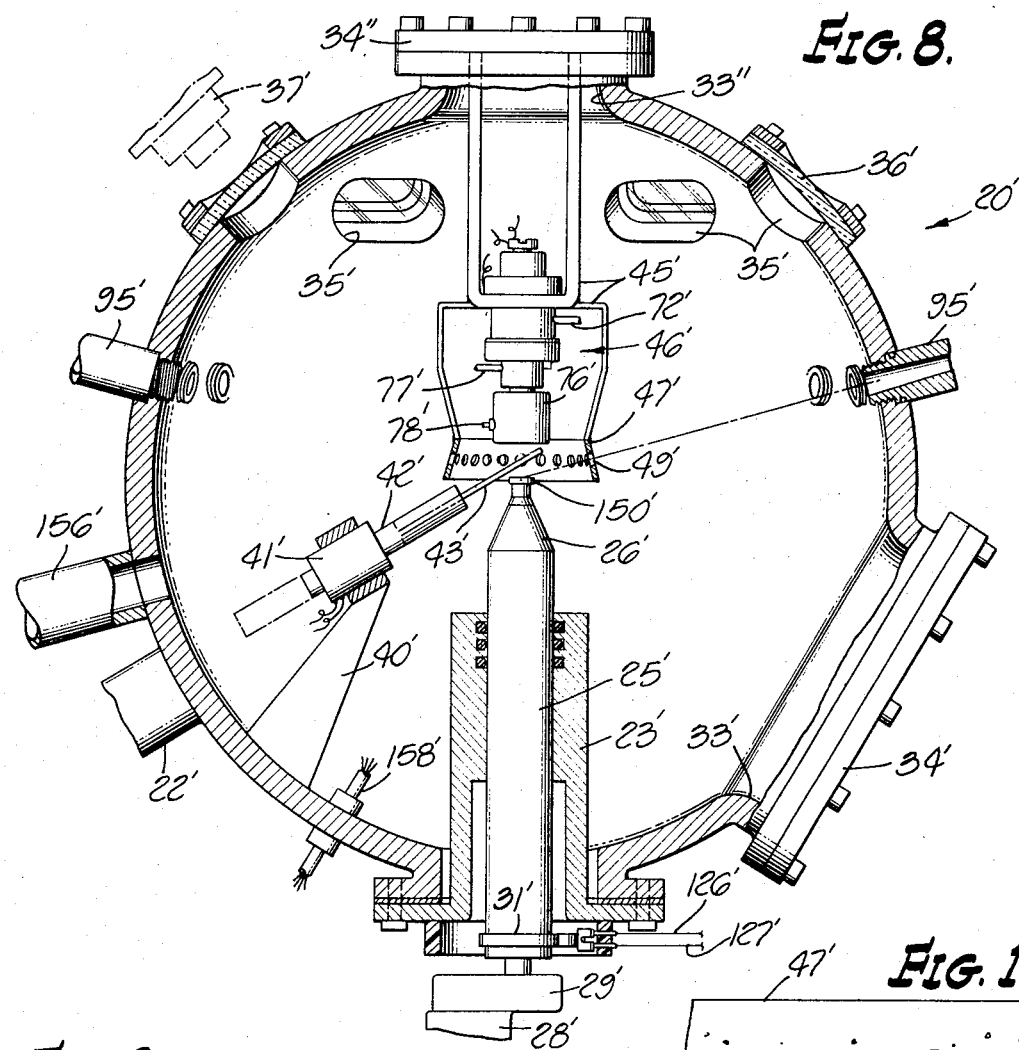

APPARATUS AND METHOD FOR SIMULATING SPACECRAFT EROSION

This invention relates to testing equipment and more particularly to a unique apparatus and method of simulating the ablative heating effects of traveling in an environment and determining the effects of collision with different kinds of particulate in such an environment.

Heretofore there has not been available any equipment or technique capable of use in the laboratory for determining the effect on the exposed surface of spacecraft and other objects during exit from and reentry into the earth's atmosphere or while moving in any selected environment. Such exposed surfaces are subjected to extremely severe temperature and heating conditions while moving at very high velocities relative to atmospheric gases, dust, rain, ice particles, vapor, micrometeorites and the like. The effect on heat shield materials, antennas, optical windows and the like surfaces when contacted and eroded by such material is of particular interest and importance to spacecraft designers and operators. Heretofore, to obtain experimental data, reliance has been placed to a high degree on telemetered information relayed from actual spacecraft to ground stations. Such results are obtained at high cost in time, equipment and human effort. Furthermore, only extremely fragmentary and limited results are obtainable and securing these is determined largely by chance.

In view of the foregoing it is a primary purpose of the present invention to provide simple, effective, highly reliable ground-based equipment operable under predetermined conditions repeatable at will for testing erosion resisting capabilities of a wide variety of materials under any of many selected exit or re-entry conditions simulating trajectory conditions of spacecraft including changing pressures, altitudes, attitudes, temperatures, heat transfer, wind and skin friction loads, ablation, densities, and velocities. For this purpose there is provided a high strength chamber capable of being evacuated to any desired degree. Any selected test object or material is supported for indexing movement successively into the flow path of independently operable high velocity accelerators. Each accelerator is operable to impact the test object with gas and/or with selected particulate at a desired velocity after the test surface has reach a temperature and a heat transfer rate corresponding to that calculated to exist under an assumed selected condition. The very high temperatures and heat rates involved are produced by various gas heaters including the unique plasma generator means disclosed herein located in the evacuated chamber. Desirably, the heater means incorporates provision for initiating and controlling its operation including means for shielding the test object from the generator until its operation has reached a desired level. The particle and gas accelerators are arranged in an array about a focal point occupied by the test object which is arranged to be stationary or indexed into successive alignment with the individual accelerators whereupon the latter is automatically activated. The accelerators employed to accelerate particulate onto the test object preferably include a support for the particulate downstream from the pressure generating chamber, the outlet to the latter being closed by a burst diaphragm. Provision is made for catching the diaphragm debris thereby eliminating any possibility of the debris impinging on the test object.

Accordingly, it is a primary object of the present invention to provide an environmental erosion simulator for testing the effect on various materials and objects traveling in the atmosphere or in space including exit from and re-entry into an atmosphere such as that surrounding the earth.

Another object of the invention is the provision of apparatus and a method for determining the ablative and erosion effects produced thereon under various environmental conditions and for recording and observing the effects produced upon encounter with gas and/or particulate.

Another object of the invention is the provision of environmental simulator apparatus including a plurality of individual accelerators together with means for indexing a test surface successively into the path of an individual accelerator and for thereupon activating that accelerator.

Another object of the invention is the provision of environmental simulator apparatus including means for reaching the desired temperature and heat rate of the test object and thereupon subjecting the heated surface to collision with selected particulate under pre-selected accurately known conditions and for recording the results produced before subjecting the surface to collision with other known particulate.

Another object of the invention is the provision of a novel apparatus and method for simulating the exit or re-entry of a test object into a planetary atmosphere while recording the effects produced on the surface under a succession of different pre-selected conditions.

Another object of the invention is the provision of environmental simulator means including means for passing a test object through an excursion traversing a pre-selected series of conditions of differing types.

Another object of the invention is the provision of environmental simulator means by which the erosion effects produced on a test object can be determined and recorded while the test object follows a prescribed path under pre-selected conditions.

Another object of the invention is the provision of environmental simulator means for simulating the passage of a test object through a variety of different environmental conditions and including means for determining the velocity of different kinds of particulate impacting the test object at different times during a single test cycle.

Another object of the invention is the provision of simulator apparatus for simulating encounter of a test object while heated or cooled with successive increments of particulate at known velocities and of known mass and at known time intervals.

Another object of the invention is the provision of unique apparatus and method of simulating a partial or complete trajectory of a spacecraft in flight and recording a wide variety of conditions and effects produced thereon under pre-selected conditions.

Another object of the invention is the provision of improved accelerator means for accelerating gas or particulate to a desired velocity including hypersonic velocities.

Another object of the invention is the provision of novel gas heater means capable of operation under simulated space environmental conditions and regulatable to heat test objects to temperatures and heating rates produced by wind and skin friction loads acting on missiles, spacecraft and the like traveling at velocities including the hypersonic range.

These and other more specific objects will appear upon reading the following specification and claims and upon considering in connection therewith the attached drawings to which they relate.

Referring now to the drawings in which a preferred embodiment of the invention is illustrated.

FIG. 1 is a generally schematic view of a typical spacecraft traveling in a space trajectory;

FIG. 2 is a fragmentary view, partly in section, through a preferred embodiment of the invention simulator apparatus in readiness for a test run;

FIG. 3 is a fragmentary cross-sectional view on an enlarged scale taken through the test object supporting pedestal including details of a plasma jet heating means for the test object;

FIG. 4 is a fragmentary cross-sectional view taken along line 4—4 on FIG. 3;

FIG. 5 is a fragmentary view, partly in section, taken horizontally and diametrically through the test chamber shown in FIG. 2;

FIG. 6 is a cross-sectional view on an enlarged scale taken through the outer end of one of the accelerators;

FIG. 6a is a fragmentary cross-sectional view of an alternate trigger system for firing the accelerator; and FIG. 7 is a cross-sectional view taken along line 7—7 on FIG. 3 showing details of the particulate discriminator;

FIG. 8 is an elevational view, largely in cross section, of another preferred embodiment of the invention;

FIG. 9 is a top plan view on a reduced scale of FIG. 9;

FIG. 10 is a fragmentary elevational view on an enlarged scale of a portion of the discriminator ring; and FIG. 11 is a fragmentary cross sectional view on an enlarged scale taken along 11—11 on FIG. 10 and showing details of typical impact craters.

Referring initially more particularly to FIG. 1, there is shown a typical spacecraft 10 in flight with its heat shield and heat sink 11 located foremost. Emanating from the rim of the heat shield are the usual primary and secondary shock waves 12, 13. Not shown, but customarily present in such craft are various items of instrumentation and communication equipment having components exposed on the exterior of the craft and subject to severe heating and erosion caused by encounter with gases, vapors and miscellaneous particulate often categorized as space debris.

The present invention provides an apparatus and technique for subjecting shields such as 11 and other exposed objects and surfaces to conditions substantially identical with the conditions experienced if actually traveling along a particular assumed trajectory. One preferred embodiment of such a simulator apparatus is designated generally 20 in FIG. 2. As there shown, the apparatus comprises a high strength thick-walled spherical housing 21 suitably supported, as by struts 22. Housing 21 is provided with a number of ports in one of which a tubular support 23 is removably secured by cap screws 24. Rotatably supported in the latter is a shaft 25 having a test object mounting end 26 located close to the center of main housing 21. It will be understood that shaft 25 is journalled in suitable bearings and gas tight seals such as those indicated at 27. The lower end of the shaft is coupled to a driving motor 28 through gear reduction means 29. Also supported on the outer end of shaft 25 is a rotary switch designated generally 30 having a contactor 31 fixed to shaft 26 and effective to bridge a pair of axially aligned contacts 32, 33 at each index position. It will be understood that there is a pair of contacts 32, 33 for each of the gas accelerators and that these contacts are mounted in a ring 34 of insulating material.

Housing 21 is equipped with an operator's access port 33 of any suitable type closable in an airtight manner by a cover 34. It will be understood that access port 33 may be positioned in any convenient location and usually along the lower side of housing 21. Another port is equipped with an optical window 35 shown in phantom lines in FIG. 2, and in full lines in its proper position in FIG. 5. Port 35 includes a high strength window 36 for use by an observer, an optical pyrometer or a recording camera, both represented schematically at 37 in FIG. 2. The optical port 35, 36 may be located at the most advantageous position for viewing the test surface at the various indexed positions occupied thereby during a particular test run. The window position shown in FIG. 5 is found particularly advantageous but it will be understood that other positions may be used and, if desired, additional observing ports may be provided.

Rigidly clamped to the upper end of the indexable shaft 25 is a bracket 40 supporting a solenoid coil 41 having an armature 42 operable to shift a barrier plate 43 from the extended position shown in full lines to a retracted position indicated in dot-and-dash lines. A second bracket 44 clamped to the top of shaft 25 includes an upright leg 45 here shown as formed of angle iron. Brackets 44, 45 support a suitable gas heater designated generally 46 for the test object.

It will be understood that, for certain test runs a suitable storage type heater of either the chemical or electrical type may be used particularly for lower velocity tests in the sub and supersonic ranges. Under these conditions well known storage type heaters are adequate whereas at higher velocities it is preferred to use the novel plasma jet heater disclosed in detail herein and to be described presently.

Bracket arm 45 is provided with a discriminator 47 having details best shown in FIG. 7 and adjustably clamped to bracket 45 by screws 48. The discriminator includes a small port 49 in alignment with a somewhat larger bracket port 50. By selecting a proper size port 49, the operator can restrict the number and distribution of particles allowed to pass onto a test object from a particular particle accelerator.

Referring now more particularly to FIG. 3, it will be understood that the plasma jet heater 46 has a massive cooled or uncooled copper body 52 clamped to the upper end of bracket 45 by a clamping nut 53. Snugly threaded into the upper end of body 52 by threads 54 is a sleeve of insulating material 55 supporting a cooled or uncooled tungsten or similar electrode 56. The outer end of this electrode is provided with an enlarged threaded portion 57 removably seated in sleeve 55 and having a kerf 58 to facilitate disassembly. A cooperating electrode 60 is mounted in a bore 61 of sleeve 55 and connected via lead 62 to one end of a transformer secondary coil 63, the other end of the latter being connected to electrode 56 via conductor 64. A capacitor 67 is connected across secondary coil 63 and the transformer primary coil 68 is connected to a suitable power supply. When the transformer is energized, a high intensity spark 69 is created in the conical space 70 between the end of electrode 60 and the adjacent surface of electrode 56.

Any suitable gas, as for example, hydrogen, nitrogen or argon can be introduced tangentially into conical chamber 70 via supply conduit 72. This rapidly spiraling gas flow, aided by the rotational effect produced by the rotating flux field created by current flow through coil 74, generates a high-efficiency, high-temperature supply of plasma which is accelerated to high velocity while expanding through the venturi-shaped passage 75. This passage is formed axially of a copper nozzle 76 threaded into the outer end of main body 52. The temperature of the issuing plasma jet may be controlled and cooled by injecting a non-reacting gas, as nitrogen, or be greatly increased by intermixing a combustible component, such as hydrogen, supplied via 72 with an oxidant, such as oxygen, supplied into the throat zone of venturi 75 via supply conduit 77. Ignition of this combustible mixture, if required, is by an igniter 78.

The operation of the plasma jet heater is highly flexible, the heater being capable of producing a wide range of temperatures depending upon the electrical energy input and the particular types and quantities of gases introduced via conduits 72, 77. For example, hydrogen and oxygen combust to produce temperatures up to a maximum of about 5,000° F. The plasma jet can be operated alone or in combination with combustible gases and is capable of producing the temperatures required for test purposes. When operating as a plasma jet generator, electrodes, 56, 60 are suitably energized, as for example, with 25,000 volts A.C. Coil 74 produces a rotating magnetic flux field in the vicinity of the electrodes and is energized as shown with one side of the coil being grounded via lead 90 to the main body of the generator and its other side connected via required power supply 91 and lead 92 to electrode 56.

Referring now more particularly to FIGS. 2, 5 and 6, there will be described a typical one of a plurality of gas and particulate generators designated generally 95 and shown as a whole in FIG. 2 and in fragmentary cross-section in FIG. 6. Each accelerator has a massive generally L-shaped main body 96 having its outlet end removably secured to an opening in chamber housing 21 by threads 97 and sealed thereto as by an O-ring means 98 (FIG. 1). The longer horizontal leg of the accelerator is provided with either a constant diameter or a venturi passage having a very long outlet diffuser 99 opening into the interior of housing 21 in desired alignment with the surface of the object to be tested mounted on the axis at the inner end of shaft 26.

Referring now to FIG. 6 there is shown details of means for generating high pressure gas to activate the particle accelerator. Detachably secured, as by threads 100, to the inlet end of passage 99 is coupling 101 having a T-shaped passage 102. One end of the T-head of passage 102 forms a debris collector chamber whereas the opposite end comprises the outlet from a small but high pressure gas chamber 104 extending axially of the thick walled housing member 105. Member 105 is threaded to outlet passage 102, the latter being normally sealed closed by a gas-tight, burst diaphragm 106. Sealed in the opposite end of pressure chamber 104 is an electrode 108 seated in the bottom of a deep cup-shaped Nylon bushing 109. Electrode 108 extends to the exterior of member 105 and is suitably clamped in an assembled position.

A bank of heavy duty capacitors 120 is chargeable from a high voltage DC power source, not shown, and has one lead 123 connected by nut 124 to the outer end of electrode 108 and its other lead 125 connected to body member 105 of the pressure generating chamber 104.

A solenoid 128 (FIGS. 2 and 6) is rigidly supported on a bracket 129 fixed to the main body 105 of the pressure chamber and its coil ends are connected to leads 126 and 127 to a power source 129 and to contacts 32, 33 of the rotary switch assembly 30.

Referring to FIG. 6 it will be understood that armature 132 of solenoid 128 is normally positioned with its outer end extending across the outer end of a metal plunger 133 having a sliding gas-tight fit with bore 134 through the wall of body member 105. The inner end of plunger 133 is equipped with a Nylon extension 135 providing the support for the upper end of the teaser wire 136 having its lower end connected to the center of electrode 108. Under these circumstances, the teaser wire extends generally axially of the pressure chamber.

When solenoid 128 is energized, its armature 132 is retracted upwardly, suddenly releasing plunger 133 whereupon the pressurized gas in chamber 104 is effective to shift the plunger outwardly to the limit permitted by the bore in the closed end of the rigidly mounted block 140 of insulation material. The parts are so proportioned that when armature 128 is energized, armature 132 retracts whereupon the air pressure in chamber 104 acts to extend plunger 133 and brings teaser 136 into contact with the side wall of chamber 104 to complete a discharge circuit for the highly charged bank of capacitors 120. The abruptly released energy creates a large arc centrally of chamber 104 and this energy instantly creates a great temperature and pressure rise in the gas held captive in the chamber.

Referring to FIG. 6a, there is shown an alternate firing mechanism for the accelerators 95 which is simpler and avoids the time lag and inertia delays inherent in the electro-mechanical firing or triggering mechanism described above in connection with FIG. 6. The same or similar parts are designated by the same reference character distinguished by a prime. It will be noted that the upper end of teaser wire 136' is suitably secured to the sidewall of bore 104, as by anchoring it beneath the rim of the burst diaphragm. The fast action firing switch 160 comprises a glass tube provided with electrodes 161, 162 projecting toward one another and sealed within the opposite ends of the switch tube 160. A third electrode 163 projects through the tube wall between electrodes 161 and 162. The latter are connected in lead 123 between capacitor 120 and a terminal leading to the lower end of teaser wire 136'. The third electrode 163 is connected to the output lead 164 of a sequence timing device 165, it being understood that this timer is similarly connected to identical three electrode switches 160 for each of the accelerators 95 or 95'. The timer may be set to complete an energizing or firing cycle to the respective fast action switches 160 for each accelerator which cycles are spaced apart by any desired time interval. Once the intermediate electrode 163 is energized with a firing potential, the entire gap between electrodes 161, 162 becomes ionized, and the power circuit is completed through teaser wire 136' substantially instantaneously. The firing of the next accelerator is initiated in like manner and, if so elected, in an extremely brief and accurately timed interval after the firing of the previous accelerator.

If it is desired to accelerate a particular kind of particulate, one or more particles of the selected particulate is supported in the throat of venturi passage 99 by mounting the same on Mylar film 142 clamped between barrel member 96 of the accelerator and member 101 of the accelerator assembly. Any of many different kinds of particulate may be adhesively or otherwise mounted on diaphragm 142 and the latter is then clamped between the surfaces of members 96 and 101 in the manner made clear by FIG. 6.

Another feature of the accelerator assembly not previously mentioned is the fact that the debris collector chamber 103 is normally closed by an air-tight plug 145 having a combined sealing and shock absorbing pad or disc of nylon or the like across its inner end. When the burst diaphragm 106 fails it is forcibly ejected through outlet passage 102 into a debris retaining chamber 103 and remains captive there out of the stream of high pressure gas flowing from chamber 104 into venturi passage 99 of the accelerator. In this manner the diaphragm debris is instantly cast out of the stream of high pressure escaping gas and does not impede or interfere with the free flow and expansion of the gas through the accelerator.

Referring now to FIGS. 2 and 3, it will be understood that the test object or material 150 being subjected to heat and erosion testing is suitably secured in the top of a cup-shaped mounting fitting 151 having a threaded shank 152 mating with threaded socket at the upper end 26 of shaft 25. Supporting within the cup-shaped fitting 151 is a strain gauge or other suitable transducer 155 having a sensor 156 in intimate contact with the rear side of test object 150. Electrical leads 157 extend from transducer 155 to the exterior of test chamber 21, along with other electrical lead wires, through a suitable fluid-tight bushing assembly 158 mounted in housing wall 21 (FIG. 2).

Referring now to FIGS. 8–11, there is illustrated a further exemplary embodiment of environmental simulator apparatus embodying the principles of the present invention wherein the same or similar components are designated by the same numeral as in the first described embodiment but distinguished therefrom by the addition of a prime. As will be recognized from a comparison of FIGS. 1–7 with FIGS. 8–11, the two apparatuses differ in no major respect. The principal differences reside in the fact that a substantially larger number of accelerators 95' are present and these are arranged in a loop surrounding the main housing. As there shown, the axes of the accelerators are inclined acutely to a common plane passing through the center of the test object. It will be understood that the angles of the accelerators with respect to this plane may vary at the discretion of the designer and as necessary in carrying out the objectives of a particular test. Although accelerators 95' are shown as similarly inclined to this plane, they may be inclined at various other angles relative to one another and there may be more than a single ring of accelerators carried by the opening through the wall of the apparatus housing. For example, it may be expedient for the purposes of a particular test to have two or more rings, or to locate the axes of the accelerators in a spiral encircling the test chamber one or more times, with their discharge ends and axes converging on the test surface located at the upper end of the rotary shaft 25'. By these expedients, it will be appreciated that the length of a test run may be greatly increased over that possible with the first described embodiment.

It is also feasible to design the apparatus for rotation of the test object in a single direction and without need for reversing the direction of rotation to return the test surface to a position opposite the first accelerator. It will also be observed that barrier 43' and its operating solenoid 41' is shown in FIG. 8 as supported from the main housing rather than from shaft 25', as it is in FIG. 2.

As is clearly shown in FIG. 8 heater 46' is supported by bracket means 45' attached to a removable closure 34'' sealed across an opening 33'' in axial alignment with the shaft 25'. The axis of stationary heater 46' is therefore in alignment with the center of test object 150' in all index positions. This greatly simplifies provision for various electrical and gas supply connections to the heater for obvious reasons.

Another difference of importance is the fact that discriminator 47' comprises an annular strip of suitable material closely encircling the test object and having a separate port 49' lying normal to the axis of the individual associated accelerator 95'. Discriminator ring 47' may be formed of any suitable material as for example, an aluminum alloy, the hardness and ductility relative to the particulate preferably being so selected that the particulate forms definite craters on impact.

Referring to FIGS. 10 and 11, there is represented typical impact craters 160, 161, each of which usually includes a characteristic encircling rim. The depth of the crater and its diameter are a function of the velocity of the particle impacting on ring 47' and producing the crater. The size of the particle can be accurately determined in advance of the test. It will be understood that the size of ports 49' varies to suit the needs of the particular test being made and is usually so chosen that the majority of the particles emanating from a particular accelerator pass through the port. However, if the port is made sufficiently small, most of the particles will impact in the area surrounding the rim of the opening and only a particular particle lying at or in close proximity to the axis of the accelerator will pass through, a condition which may be highly desirable for certain types of tests.

The operation of the embodiment differs in no major respect from that of the first embodiment to be described presently. It will be understood that each of accelerators 95' may be constructed in the same manner described in detail above and programmed for activation in sequence and as determined by the operation of the indexing motor 28' effective to close the electrical circuit to the accelerators in turn and advancing the test specimen or object into the path of the gas and particulate issuing therefrom.

OPERATION

Let it be assumed that it is desired to conduct an oblative or erosion test on a particular material intended for use on the exterior of a spacecraft as the craft passes through a predetermined trajectory relative to the earth's atmosphere. A small plaque of material 150 chosen for the part is prepared and supported as indicated in FIG. 3 with its rear surface in contact with sensor 156 of transducer 155. The upper lip edge of the fitting 151 enclosing the transducer is so prepared as to support the exposed surface of the test object at an appropriate attitude, such as that indicated in FIG. 3.

If the trajectory is to pass through dust clouds, rain, snow, ice and micrometeorite showers, then the various accelerators 95 are properly prepared each with particulate of the type to be encountered by the test object during its trajectory. For example, the Mylar diaphragm 142 of one accelerator is prepared with dust particulate. The corresponding diaphragm of another accelerator is prepared with water vapor; another with ice crystal particulate; another with micrometeorite particulate, etc. The pressure chamber 104 of each accelerator is also armed with a teaser 136, locked in its cocked position as shown in FIG. 6 by its associated armature 132 and the outlet end of each pressure chamber is equipped with a burst diaphragm 106.

The foregoing preparations having been completed with respect to each of the accelerators, each of the pressure chambers is charged with an appropriate quantity of gas via a charging conduit 152. While various gases may be employed, higher velocities are achieved using a very light gas, such as hydrogen or helium. The kind of gas and the pressure to which the chamber is charged has a direct bearing on the velocity attained by the gas as it discharges from the accelerator and on the velocity to which the particulate mounted on diaphragm 142 is accelerated. Accordingly, it is desirable that the charging duct 152 be connected with suitable gauge or pressure regulator means, not shown, to facilitate the gas charging operation.

The next step to be performed is that of evacuating the interior of housing 21 to a high vacuum corresponding to that at the start of flight trajectory. Evacuation is accomplished using suitable evacuating equipment connected to the interior of housing 21 via conduit 156. The bank of capacitors 120 for each accelerator 95 is charged to a selected level desired for the associated accelerator following which the charging switch not shown is opened. The apparatus is now in readiness for the test run, it being understood that the optical pyrometers and the recording camera equipment indicated at 37 are properly positioned and trained on the test object 150 through window 36 and that the test object itself is slightly misaligned with the first one of the row of accelerators 95 to be activated in succession. If the test object is operating in a rarified atmosphere as the first particulate is encountered, the test object is brought up to the appropriate initial temperature by heater 46. The operation of the heater is stabilized with heat shield 43 extended crosswise of the discharge end of the heater as is illustrated in FIGS. 2 and 3. Once the heater temperature has been stabilized to the selected temperature, solenoid 41 is activated to retract heat shield 43 whereupon the heater quickly heats the test object 150 to the proper temperature, simulating desired conditions as the first of the accelerators 95 is activated.

The test run is initiated by starting motor 28 to rotate shaft 25 supporting the test object until the test object is aligned with the discharge end of the first of accelerators 95.

While not so shown, it will be understood that the test object and heater 46 need not be located opposite the focus of the axes of the series of accelerators as now shown in FIG. 2, but may be mounted on arms carried by shaft 25 and positioned to be indexed by this shaft successively into the path of the discharge from the accelerators 95. In fact, it may be desirable and is within the scope of this invention to make the supporting arm for the heater and the test object adjustable in length thereby to vary the proximity of the test object to the outlet end of the accelerators thereby to vary the wind and skin friction loading on the test object. A solenoid operated step-by-step feed would suffice to vary the radial length of the arm supporting the heater and the test object relative to the axis of shaft 25.

As the test object reaches this first index position, rotary switch 30 completes a circuit between contacts 32, 33 energizing the solenoid 128, thereby retracting armature 132 and allowing the pressure within chamber 104 to extend plunger 133 outwardly so that the upper end of teaser 136 completes a circuit for the highly charged bank of capacitors 120. This creates a massive arc and releases the energy into the captive gas in chamber 104 thereby substantially instantly raising its temperature and pressure to the desired high value, rupturing diaphragm 106 and releasing this very high pressure gas into accelerator passage 99.

The debris of the diaphragm 106 is immediately rejected by being cast and held captive in debris chamber 103 whereas the pressurized gas flows into venturi 99, instantly destroying diaphragm 142 and accelerating the particulate thereon by drag effect to the desired velocity for the particular test condition being simulated. Usually, and if desired, the particulate is accelerated to hypersonic velocity but may be accelerated to any lower velocity prior to impacting on the test object. Only accelerated particulate aligned with port 49 passes through and impacts on the test object, all other particulate impinging on discriminator 47.

An observation is then made of the test object through window 36, and a photographic record is taken. Shortly thereafter motor 28 operates to index shaft 25 and test object 150 into alignment with the axis of the next accelerator, stepping of the test object to its different indexed position preferably being carried out in time-delayed sequence by any suitable programmed control for motor 28. As the specimen rotates into alignment with the axis of the next accelerator, discriminator 47 and heater 46 are rotated therewith. Likewise, solenoid 41 controlling the operation of the heat barrier or shield 43 is also rotated since it is carried by and rotates with shaft 25. Rotary switch 30 will be understood as cooperating with brush carrying arm 31 to complete an energizing circuit for the successive ones of the solenoids 128 controlling activation of the respective accelerators 95 as the test object 150 reaches its index position relative to a particular accelerator.

From time to time it is usually desirable to change the temperature of the test object to correspond with changing conditions occurring. Velocity, skin friction, wind loading, atmospheric pressure and other conditions change during the trajectory. Usually the trajectory progresses through atmosphere of varying density, a condition corresponding to changing temperature conditions on the surface of the test object. Such temperature changes irrespective of the direction of the change is readily achieved by regulating the operating condition of heater 46. This is accomplished in one of many ways including varying the applied voltage between electrodes 56 and 60 and/or the temperatures, types and quantities of gases introduced through supply pipes 72, 77. An infinite degree of regulation is readily achieved by varying the pressure, quantities, preheated temperature and types of the gases introduced through these two pipes. Any substantial temperature change is preferably obtained while the heat barrier shield 43 is extended to lie between the heat and the test object. Once stable operating conditions at a desired temperature are obtained and checked using an optical pyrometer positioned opposite window 36 and trained on the adjacent surface of the heat barrier, barrier 43 is retracted by energizing solenoid 41 in the proper direction. Once the surface of the test object has been stabilized at the desired temperature and checked by the pyrometer, the next accelerator is activated provided the test object is in position therewith.

It will be understood that solenoid 41 for the heat barrier may be of the double acting type which extends the barrier in one direction during one energizing cycle and retracts it during the next energizing cycle. Alternatively, the solenoid may be of the single acting type which holds the barrier in one direction when energized and relies upon spring action to restore the barrier to its alternate position when the solenoid is de-energized.

As is evident from FIGS. 3 and 4, conduits 71, 77 are there shown as discharging tangentially into the flow passage, but on the opposite sides thereof. This disposition of the gas inlets promotes intimate mixing and more efficient heating. Any gas introduced through conduit 72 augments and increases the swirling initiated and produced by the rotating flux field of coil 74. It will be understood that this coil is protected from overheating by a suitable layer of heat insulating material 74' interposed between the coil and the main body of the heater.

It is also pointed out that the sensing device 155, 156 is connected to appropriate dynamic recording equipment through suitable amplifiers to provide a record of the impact of particulate upon the test object during operation of each of the accelerators. Desirably, the same recorder making a record of transducer 155 also contains a running record of the stabilized temperatures of heater 46 after these have been established for a particular index position.

Although the test object 150 as represented in the present drawing comprises a thin disc supported at an acute angle to a plane through the axes of the several accelerators it will be understood that the test object may consist of a miniature representation of any object and that this may be disposed at any angle relative to the axis of the several accelerators by providing a suitably contoured supporting fitting 151 for the test object and for sensor 155. Likewise, it will be understood that the heater 46 may be disposed at different angles by providing a suitable substitute bracket 44, 45. These various fittings and accessories may be varied widely and as found most suitable and convenient for conducting a particular type of test.

Although the foregoing description of the operation has been described with reference to the embodiment shown in FIGS. 1–7, it will be understood that the second illustrative embodiment operates essentially in the same manner except for obvious differences based on the described structural differences. Only shaft 25' and the components attached to the shaft rotate. It will be understood that the electrical connections to the transducer shown in FIG. 3 may include slip rings, not shown, but mounted in well known manner on shaft 25'.

While the particular apparatus and method for simulating spacecraft erosion herein shown and disclosed in detail is fully capable of attaining the objects and providing the advantages herein stated, it is to be understood that it is merely illustrative of the presently preferred embodiments of the invention and that no limitations are intended to the details of construction or design herein shown other than as defined in the appended claims.

We claim:

1. That method of determining the successive and cumulative effects of collision of a test object with a variety of particulate matter while following a particular trajectory through the atmosphere which comprises: providing within a sealed chamber a desired atmospheric environment condition, supporting a test object within said chamber, preheating and maintaining the exterior surface of said test object heated to a temperature corresponding to that generated by travel of the object at a selected velocity under the said desired atmospheric environment condition, thereafter accelerating successive groups of preselected quantities, kinds and sizes of particulate matter to a relative velocity corresponding generally to said selected velocity of travel, and impacting said successive groups of accelerated particulate matter on the preheated test object in programmed sequence.

2. That method defined in claim 1 characterized in the step of recording the results produced by impact of particulate matter on said preheated surface before impacting the heated surface with additional particulate matter.

3. That method defined in claim 1 characterized in the steps of successively varying the preheated temperature of said test area and impacting the area with said successively accelerated groups of particulate thereby simulating encounter of the test object with successive groups of said preselected quantities, kinds and sizes of particulate under changing atmospheric environmental conditions representing travel of the test object along a given trajectory therethrough.

4. That method defined in claim 1 characterized in the step of making a visual recording of the results produced on the test object for each successive group of particulate matter accelerated into impact therewith.

5. That method defined in claim 1 characterized in that the particulate impacted on said test area comprises crystalline water vapor.

6. That method defined in claim 3 characterized in the steps of movably supporting said test object for indexing into successive stationary positions, and impacting said test object with particulate between indexing operations.

7. That method defined in claim 1 characterized in the step of sensing and recording the magnitude of the impact of said test object with particulate.

8. That method defined in claim 1 characterized in the step of shielding said test object from the source of heat therefor until the operation of the heat source has become stabilized within a desired temperature range.

9. That method defined in claim 1 characterized in the step of creating a pilot arc to initiate breakdown of a primary arc to initiate said successive particulate accelerating cycles.

10. Atmospheric environmental simulator apparatus for use in determining the effect on a test object of encounter with particulate in a lower atmospheric environment, said simulator apparatus comprising high strength sealable chamber means adapted to be evacuated to a desired lower atmospheric environment condition, means for supporting and indexing a test object to different positions within said chamber means, means for preheating a selected surface area of the test object to a temperature simulating high velocity travel of the object under a selected lower atmospheric environmental travel condition, and a plurality of spaced-apart independently operable means for accelerating selected particulate on the test object at a selected velocity in a programmed sequence after the object has been preheated and indexed into a position aligned with a respective one of said plurality of particulate accelerating means.

11. Atmospheric environmental simulator apparatus as defined in claim 10 characterized in the provision of heat barrier means movably supported within said chamber means and including means for moving the same from a first position shielding the test object from the heating means therefor to a second non-shielding position relative to said heating means.

12. Atmospheric environmental simulator apparatus as defined in claim 10 characterized in the provision of sensitive transducer means operatively associated with the test object and effective to sense the magnitude of a collision of the test object with particulate.

13. Atmospheric environmental simulator apparatus as defined in claim 10 characterized in the provision of ported indexing means including means for indexing the same in unison with the test object and effective to shield the test object from collision with particulate except for particulate passing through said ported discriminator means.

14. Atmospheric environmental simulator apparatus as defined in claim 10 characterized in that said preheating means comprises plasma jet generating means having a plasma jet passage positioned to direct a high temperature plasma jet onto said test object adequate to preheat the same to a temperature representative of travel of the test object at a predetermined velocity and attitude in an environment of predetermined gas density.

15. Atmospheric environmental simulator apparatus as defined in claim 14 characterized in that said plasma jet means includes means for varying the temperature of the jet issuing therefrom.

16. Atmospheric environmental simulator apparatus as defined in claim 15 characterized in that said plasma jet generating means includes means for rotating the plasma jet about its own axis.

17. Atmospheric environmental simulator apparatus as defined in claim 10 characterized in that said particulate accelerating means includes chamber means for abruptly increasing the pressure of a low molecular weight gas and releasing the same into a long nozzle having its axis aligned with said test object, fluid-tight burst diaphragm means holding said low molecular weight gas captive until the pressure thereof exceeds the strength of said burst diaphragm means, and means downstream from said burst diaphragm means for releasing selected particulate into the gas as it escapes along said expanding nozzle.

18. Atmospheric environmental simulator apparatus as defined in claim 17 characterized in that said chamber means has an outlet into said nozzle offset to one side of the axis of said nozzle.

19. Atmospheric environmental simulator apparatus as defined in claim 18 characterized in that said gas outlet into said nozzle includes a passage extending crosswise of said nozzle and including a cavity for receiving and holding captive debris from said burst diaphragm.

20. Atmospheric environmental simulator apparatus as defined in claim 17 characterized in means for releasing different kinds of particulate into different ones of said particulate accelerating means whereby said test object can be subjected to repeated collisions with different kinds of particulate in sequence during the same test run and representative of movement of the test object along a selected trajectory.

21. Atmospheric environmental simulator apparatus as defined in claim 17 characterized in that said plurality of particulate accelerating means are supported at closely spaced intervals along the wall of said chamber means, and said support means for the test object including means for indexing the test object sequentially into alignment with the respective axes of said particulate accelerating means thereby to lie in a collision path of particulate accelerated therefrom.

22. Atmospheric environmental simulator apparatus as defined in claim 21 characterized in the provision of means assuring that the test object is properly indexed into alignment with a particular particulate accelerator before it is possible to activate that accelerator and for assuring that all other of said particulate accelerators remain deactivated.

23. Atmospheric environmental simulator apparatus as defined in claim 10 characterized in the provision of ported discriminator means having a separate port aligned with the axis of a respective one of said particulate accelerator means through which particulate can pass into impact with the test object, and said discriminator means including barrier means effective to arrest particulate failing to pass through a port thereof and providing a fresh impact area for particulate from each of said independently operable accelerator means.

24. Atmospheric environmental simulator apparatus as defined in claim 23 characterized in that the depth and diameter of a crater formed by impact of particulate thereof provides an accurate means of estimating the velocity of particulate achieved by the associated one of said particulate accelerator means.

25. Atmospheric environmental simulator apparatus as defined in claim 10 characterized in that said independently operable particulate accelerator means are arranged in a group with each directed at the test object.

26. Atmospheric environmental simulator apparatus as defined in claim 10 characterized in the provision of means for supporting said preheating means for said test object independently of the means for supporting the test object with provision for moving one of said supporting means independently of the other supporting means.

27. Atmospheric environmental simulator apparatus as defined in claim 23 characterized in that said discriminator means is effective to indicate the velocity of particulate relative to said test object as successive groups of particulate are accelerated in programmed sequence toward impact with said test object.

28. Atmospheric environmental simulator apparatus as defined in claim 10 characterized in that each of said independently operable means for accelerating selected particulate include a high strength chamber having an outlet normally sealed closed by a burst diaphragm and having an outlet passage on the downstream side thereof opening non-axially into the inlet end of nozzle means effective to accelerate high pressure gas released thereinto upon failure of said burst diaphragm, and cavity means positioned in alignment with said outlet passage and offset from said nozzle means effective to receive and retain debris of said burst diaphragm while permitting the released pressurized gas to escape along said expansion nozzle means.

29. Apparatus as defined in claim 28 characterized in that said debris cavity means includes removable plug means providing servicing access to said cavity means.

30. Apparatus as defined in claim 29 characterized in that said debris cavity means includes non-metallic impact means positioned to be impacted by burst diaphragm debris upon failure of the burst diaphragm.

31. Atmospheric environmental simulator apparatus as defined in claim 10 characterized in that each of said independently operable means for accelerating selected particulate include a high pressure chamber means having an outlet port adapted to be sealed closed by burst diaphragm means, gas accelerating passage means having an inlet misaligned with said outlet port and in communication therewith, means for charging said chamber means with gas and for suddenly increasing the pressure thereof many times the charging pressure thereby causing abrupt failure of said burst diaphragm, and cavity means aligned with said outlet port and positioned to receive and hold captive debris of said burst diaphragm.

32. Apparatus as defined in claim 31 characterized in that said debris-receiving cavity is aligned with the outlet from said chamber means and located on the opposite side of said nozzle means from said chamber means.

33. Apparatus as defined in claim 31 characterized in that said debris-receiving cavity includes removable cleanout plug means providing access to said cavity for the removal of debris therefrom.

34. A high velocity accelerator comprising high pressure chamber means chargeable with pressurized gas and having an outlet port normally sealed closed by burst diaphragm means, gas accelerating passage means having an inlet in communication with said outlet port and effective to accelerate high pressure gas released from said chamber means when the pressure therewithin disintegrates said burst diaphragm means, means for suddenly dissipating a large quantity of electrical energy in an arc supported within said chamber means, said last-named means including a teaser wire normally forming part of an open circuit with an internal part of said high pressure chamber means and including means for storing a large quanity of stored electrical energy, and means including fast-action switch means energized by the pressurized gas charge in said chamber means operable to shift said teaser wire from an open-circuit condition into position to form an arc-initiating path for said stored electrical energy thereby suddenly completing a circuit from said stored electrical energy through said teaser wire to release said stored energy into the gas in said chamber means.

35. A high velocity accelerator as defined in claim 34 characterized in that said fast-action switch means includes solenoid means normally effective to lock said teaser shifting means in open circuit position and operable upon energization of said solenoid means to release said teaser wire shifting means.

36. A high velocity accelerator as defined in claim 35, characterized in that said means energizing said solenoid means comprises timer means.

37. A high velocity gas accelerator comprising a high strength gas chamber opening into a gas accelerating passage means through a burst-diaphragm-closed port, said accelerator being characterized by the provision of improved means for suddenly releasing stored electrical energy into gas trapped in said gas chamber comprising insulated electrode means for supporting one portion of teaser wire means in said gas chamber, means movably supporting another portion of said teaser wire means in said gas chamber and effective to hold said teaser means in open circuit condition normally and movable to a second position wherein said teaser means is effective to form an arc to release a large quantity of electrical energy into said gas chamber abruptly thereby to increase the gas pressure many fold.

38. A high velocity gas accelerator as defined in claim 37 characterized in that said means movably supporting a portion of said teaser wire means is movable to a position wherein said teaser means contacts the interior of said gas chamber means to complete an electrical path between said chamber means and said electrode means.

39. A high velocity gas accelerator as defined in claim 38 characterized in that said movable support means for said teaser means is movably supported through the wall of said gas chamber means, said means normally holding said movable support means in open circuit including fast-action release means exteriorly of said gas chamber means, and the pressure of gas held captive in said chamber means being effective when said release means is activated to move said teaser means into electrical contact with the wall of said gas chamber means.

40. Environmental simulator apparatus for use in determining the effect on a test object of encounter with particulate in a selected atmospheric environment, simulator apparatus comprising sealable chamber means adapted to be evacuated to a desired environment condition, means for bringing a selected surface area of the test object to a selected temperature condition simulating a selected environmental condition, a plurality of independently operable means each operable to accelerate selected particulate against said selected surface area of the test object at a selected velocity, said accelerator means each including teaser wire means for initiating instantaneous operation thereof, and fast-action switching means for each of said accelerator means including sequencing timer means effective to release a mass quantity of electrical energy into successive respective ones of said accelerator means via the teaser wire means thereof.

41. Environmental simulator apparatus as defined in claim 40 characterized in that said fast-action switch means includes a pair of spaced electrodes connected in circuit with said teaser wire and a source of electrical energy, and third electrode means connected in circuit with said sequence timer means and one of said pair of electrodes and effective when energized instantly to complete an arc between said pair of electrodes.

* * * * *